(12) United States Patent
Yamada et al.

(10) Patent No.: US 7,281,863 B2
(45) Date of Patent: Oct. 16, 2007

(54) MODULE CONNECT/DISCONNECT STRUCTURE AND METHOD FOR DISCONNECTING A MODULE USING THE STRUCTURE

(75) Inventors: Yasushi Yamada, Tokyo (JP); Kazufumi Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/020,273

(22) Filed: Dec. 27, 2004

(65) Prior Publication Data

US 2005/0141827 A1    Jun. 30, 2005

(30) Foreign Application Priority Data

Dec. 26, 2003    (JP)    ............. 2003-433503

(51) Int. Cl.
*G02B 6/36* (2006.01)
*G02B 6/42* (2006.01)

(52) U.S. Cl. .............. 385/92; 385/53; 385/88

(58) Field of Classification Search .......... 385/53, 385/88–92
See application file for complete search history.

(56) References Cited

U.S. PATENT DOCUMENTS 4,260,210 A * 4/1981 Babuka et al. .............. 439/347
5,901,263 A * 5/1999 Gaio et al. .................... 385/92
6,556,445 B2 * 4/2003 Medina ...................... 361/728
6,746,158 B2   6/2004 Merrick
6,830,385 B2 * 12/2004 Ishigami et al. .............. 385/92
6,883,971 B2 *  4/2005 Chiu et al. .................... 385/53
6,916,123 B2 *  7/2005 Kruger et al. ................ 385/92
7,004,647 B2 *  2/2006 Malagrino et al. ............ 385/92
2003/0142917 A1  7/2003 Merrick
2003/0198025 A1  10/2003 Cao

FOREIGN PATENT DOCUMENTS

DE       100 55 683        5/2002
WO    WO 03/098750        11/2003

* cited by examiner

*Primary Examiner*—Tina M. Wong
(74) *Attorney, Agent, or Firm*—Young & Thompson

(57) ABSTRACT

An improved disconnect structure for SFP optical transceiver modules uses a slide 21 that travels relative to the module housing over a limited range. The slide 21 has operating pieces 28 which are elastically displaceable to elastically displace a spring plate 18 of the cage in a direction to release the locked state. The slide initially moves relative to the module housing to deflect the spring plate downwardly and release the locked state. When the slide then reaches the end of its range of motion relative to the module housing, further withdrawal of the slide pulls the module housing along with it, removing the module form the cage.

12 Claims, 10 Drawing Sheets

PRIOR ART

MODULE CONNECT/DISCONNECT STRUCTURE AND METHOD FOR DISCONNECTING A MODULE USING THE STRUCTURE

BACKGROUND OF THE INVENTION

1. Field of the Invention

The present invention relates to a module connector structure, preferably but not necessarily in an optical module for performing optical communication, and in preferred embodiments more particularly relates to an SFP (Small Form Factor Pluggable) optical transceiver module whose housing is received within a cage of equipment to which the optical module is attached. The present invention also relates to a method for disconnecting such a module from a cage in which it is inserted.

2. Description of Related Art

Optical transceiver modules conventionally include a light emitting element and a light receiving element that perform photoelectric conversion to enable communication by optical fiber. Such optical transceiver modules include a housing designed to be detachably attached inside a cage mounted on a circuit board to which the module is connected. An electrical connector connected to the board is provided in the cage, so that a connecting terminal of the optical transceiver is constructed to be connected to the electric connector when the optical transceiver module is attached in the cage. The optical transceiver module thus constructed enables optical communication by converting an optical signal transmitted to and received from the optical fiber into an electric signal transmitted to and received from the board.

However, when the optical transceiver module is pulled out of the cage during operation of the optical transceiver module, there is not only the possibility that the communication is interrupted in progress, but also the possibility that the communication apparatus including the optical transceiver module is out of order. Therefore, the optical transceiver module needs to be reliably fixed to an inside of the cage at least during operation.

For example, in recent years, the standard of measure called MSA (Multi Source Agreement) of SFP (Small Form-factor Pluggable) transceivers is established to give compatibility to the optical transceivers provided by various companies, and the shapes and sizes of the SFP transceivers and the cages to which the SFP transceivers are attached are standardized. According to the MSA standard of the SFP, a protruding locking portion is provided at a bottom surface of an optical transceiver, and a cage is provided with a spring plate portion in which a locking recess (hole or depression) is formed in which the locking portion is locked.

Therefore, when the optical transceiver module is attached inside the cage, the locking portion of the optical transceiver module is locked in the locking hole of the cage, so that the optical transceiver module can be locked into the cage. On the other hand, it is necessary to release locking by detaching the locking portion from the locking hole of the spring plate portion by some means, when the optical transceiver module is removed from the cage.

As a conventional optical transceiver of this type, a construction including an ejector for releasing locking is disclosed in U.S. Pat. No. 6,434,015, the entirety of which is hereby expressly incorporated by reference.

Figure 11:
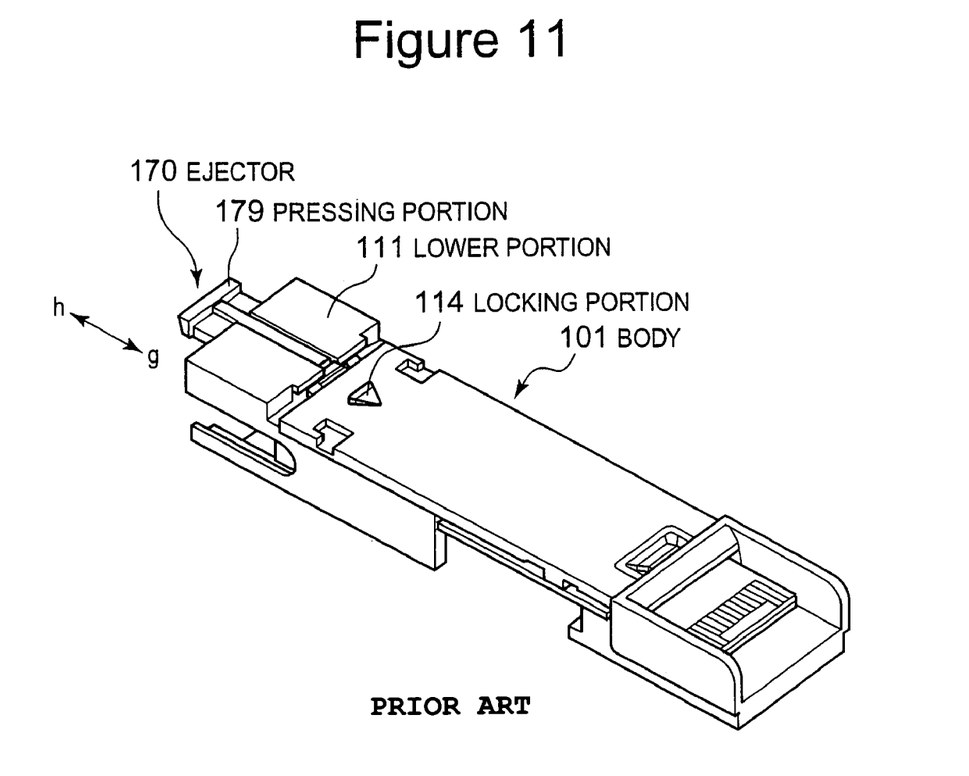
FIG. 11 is a perspective view showing a conventional optical module.

FIG. 11 is a perspective view showing the conventional optical transceiver disclosed in U.S. Pat. No. 6,434,015 with its undersurface facing upward.

The conventional optical transceiver shown in FIG. 11 has a body 101 with a locking portion 114 formed thereon, which houses a light emitting element and a light receiving element, and an ejector 170 for removing the locking portion 114 from a locking hole (not shown) of the spring plate portion of a cage. The ejector 170 is housed inside an ejector seat which is formed at a lower portion 111 of the body 101, so that by pressing a pressing portion 179 provided at a rear end of the ejector 170, a tip end portion of the ejector 170 can be protruded to a vicinity of the locking portion 114 from an inside of the ejector seat. The tip end portion of the ejector 170 is designed to release the locked state of the locking portion 114 and the locking hole by bending the spring plate portion if it is projected when the locking portion 114 of the optical transceiver is locked in the locking hole of the spring plate portion of the cage.

Accordingly, this optical transceiver can removed from the inside of the cage by pressing a pressing portion 179 of the ejector 170 in the direction of the arrow g in the drawing to protrude the tip end portion to the vicinity of the locking portion 114, and releasing the locked state of the locking hole of the spring plate portion of the cage and the locking portion 114.

However, since the SFP optical transceiver according to the MSA standard is constructed to be about 10 mm high, and about 14 mm wide, and the module itself is compact, the ejector 170 (see FIG. 11) included in such an optical transceiver is a very small component. Therefore, the pressing portion 179 of the ejector 170 shown in FIG. 11 calls for a pushing operation with a fingertip or a nail in some housings. However, in the state in which the optical transceiver is attached in the cage, there is hardly a gap between the board on which the cage is loaded and the undersurface of the optical transceiver, and therefore a fingertip sometimes cannot successfully reach the pressing portion 179 of the ejector 170, thus causing the problem that the operation for releasing lock is difficult to perform.

The removing direction of the optical transceiver shown in FIG. 11 from the cage is the direction of the arrow h in FIG. 11, and this direction is the opposite direction from the pushing direction (the direction of the arrow g) of the ejector 170. Namely, in the conventional optical transceiver, the operating direction for releasing lock, and the operation direction for taking the optical transceiver from the cage are opposite to one another, and these operations have to be performed independently from each other. Therefore, the optical transceiver has the problem that the operation of releasing the lock to taking out the optical transceiver from the cage is troublesome.

SUMMARY OF THE INVENTION

Consequently, the present invention has its object to provide a module connector structure that provides improved disconnect operation when disconnecting the module from a cage or housing into which it had been received, and a method for disconnecting such a module from a cage or housing.

In order to attain the aforementioned object, a module connector structure according to a preferred embodiment of the present invention includes, in a module designed for insertion into a cage, a connector structure comprising a locking protrusion formed on a housing of the module, the locking protrusion being adapted to engage in a recess of a spring plate in the cage; a slide mounted on the housing and slidably movable relative to the housing over a limited range; the slide having surfaces cooperating with opposing surfaces on the cage to cause the spring plate to deflect downwardly so as to free the locking protrusion from the recess as the slide is moved relative to the housing in a direction of withdrawing the module from the cage; wherein the slide is connected to the housing such that when the slide reaches an end of its range of motion relative to the housing, a further withdrawing force exerted on the slide serves to move the slide and the housing conjointly, thereby to withdraw the module from the cage.

Another embodiment of the invention provides, in an optical module having a housing in which communicating structure for performing optical communication is contained, and in which the housing is provided with a locking portion which is locked in a locking hole of a spring plate portion provided at a cage side in which the housing is attached, lock releasing means having a slide member movably provided at the housing in parallel with an attaching and detaching direction of the housing with respect to the cage and a supporting shaft provided at the housing and movably supporting the slide member to release a locked state of the locking hole and the locking portion. The slide member has operating pieces provided to be elastically displaceable to elastically displace the spring plate portion in a direction to release the locked state, and a supporting shaft receiving hole, which is provided along a moving direction of the slide member, and through which the supporting shaft is inserted. The operating piece is provided with a protrusion at an opposing surface opposed to the housing, and the housing is provided with a protruding portion for elastically displacing the spring plate portion by the operating piece by being engaged with the protrusion.

In the optical module according to this embodiment of the invention, the protrusion of the operating piece is engaged with the protruding portion by operating the slide member to move, and the operating piece is elastically displaced by the protruding portion. The elastically displaced operating piece elastically displaces the spring plate portion in the direction to release the locked state of the locking hole and the locking portion. The moving range of the slide member is reliably restrained by the supporting shaft inserted into the supporting shaft receiving hole, and therefore the slide member is reliably prevented from falling from the housing when pulled out of the housing. Further, the slide member is reliably restrained in the moving range by the supporting shaft inserted into the supporting shaft receiving hole, whereby the engaged state and engagement released state of the protrusion of the operating piece and protruding portion of the housing are smoothly switched, and reliability of the operation for releasing the locked state of the locking portion and the locking hole by the operating piece is sufficiently ensured. Therefore, according to the optical module, the operation of releasing the locked state of the cage and the housing, and the operation of taking the optical module out of the cage are successively performed by operating the slide member to move with respect to the housing.

It is preferable that the operating piece of the slide member is provided with a movement restraining portion for restraining movement of the slide member by being engaged with the housing when the slide member is pulled out of the housing. Thereby, the movement restraining portion of the operating piece is engaged with the housing when the slide member is pulled out of the housing, whereby the slide member is further reliably prevented from falling from the housing.

An optical module according to another embodiment of the present invention includes, in an optical module having a housing in which communicating means for performing optical communication is contained, in which the housing is provided with a locking portion which is locked in a locking hole of a spring plate portion provided at a cage side in which the housing is attached, lock releasing means having a slide member movably provided at the housing in parallel with an attaching and detaching direction of the housing with respect to the cage to release a locked state of the locking hole and the locking portion. The slide member has operating pieces provided to be elastically displaceable to elastically displace the spring plate portion in a direction to release the locked state. The operating piece has a movement restraining portion for restraining movement of the slide member by being engaged with the housing when the slide member is pulled out of the housing, and a protrusion provided at an opposing surface opposed to the housing. The housing is provided with a protruding portion for elastically displacing the spring plate portion by the operating piece by being engaged with the protrusion.

In the optical module according to this embodiment of the present invention constructed as above, by operating the slide member to move, the protrusion of the operating piece is engaged with the protruding portion and the operating piece is elastically displaced by the protruding portion. The elastically displaced operating piece elastically displaces the spring plate portion in the direction to release the locked state of the locking hole and the locking portion. The movement restraining portion of the operating piece is engaged with the housing when the slide member is pulled out of the housing, whereby the slide member is reliably prevented from falling from the housing.

It is preferable that the optical module according to the present invention includes a lever rotatably provided at the slide member to operate the slide member to move, and that the slide member is provided with a lever restraining portion for restraining a rotational position of the lever. Thereby, the lever rotated with respect to the slide member is stopped at a predetermined position, and therefore operability when operating the slide member to move by the lever is enhanced.

It is preferable that the lever is provided with a locking portion which is locked at the housing in a state in which the locking portion abuts to the housing and the housing is provided with a locking groove in which the locking portion of the lever is locked. Thereby, the locking portion of the lever is locked in the locking groove of the housing when, for example, the lever is not used, whereby the lever is prevented from float with respect to the housing.

A method for releasing a locked state of a module and a cage according to preferred embodiments of the present invention, in which the housing is provided with a locking portion which is locked in a locking hole of a spring plate portion provided at a cage side in which the housing is attached, comprises actuating lock releasing means having a slide member movably provided at the housing in parallel with an attaching and detaching direction of the housing with respect to the cage and a supporting shaft provided at the housing and movably supporting the slide member to release a locked state of the locking hole and the locking portion. The method of the present invention preferably has the steps of moving the slide member by moving the supporting shaft along a supporting shaft receiving hole provided in a moving direction of the slide member, and releasing the locked state by elastically displacing the spring plate portion by engaging a protrusion included by an operating piece provided at the slide member to be elastically displaceable and a protruding portion provided at the housing.

Another method for releasing a locked state of an optical module and a cage according to the present invention is a method for releasing a locked state of an optical module having a housing in which communicating means for performing optical communication is contained, in which the housing is provided with a locking portion which is locked in a locking hole of a spring plate portion provided at a cage side in which the housing is attached, and the cage in which the optical module is attached, the optical module includes lock releasing means having a slide member movably provided at the housing in parallel with an attaching and detaching direction of the housing with respect to the cage to release a locked state of the locking hole and the locking portion. The method of this embodiment of the present invention has the steps of releasing the locked state by elastically displacing the spring plate portion by engaging a protrusion included by an operating piece provided at the slide member to be elastically displaceable and a protruding portion provided at the housing, and restraining a movement of the slide member by engaging the operating piece of the slide member with the housing when the slide member is pulled out of the housing.

As described above, according to preferred embodiments of the present invention, operability when releasing the locked state of the cage and the housing is enhanced, and the operation of releasing the locked state of the cage and the housing, and the operation of taking the optical module out of the cage can be performed with a simple operation.

BRIEF DESCRIPTION OF THE DRAWINGS

Preferred embodiments of the invention will now be explained in greater detail with reference to the accompanying drawings, in which:

FIGS. 1(a) and 1(b) are perspective views showing a state of an operation of attaching and detaching an optical module of this embodiment to and from a cage from a bottom surface side, in which FIG. 1(a) shows a state in which the optical module is attached to the cage, and FIG. 1(b) shows a state in which the optical module is detached from the cage;

FIGS. 2(a), (b) and (c) are views showing the optical module, in which FIG. 2(a) shows a plan view, FIG. 2(b) shows a side view, and FIG. 2(c) shows a bottom view, respectively;

FIGS. 3(a), (b) and (c) are views showing the housing 11, in which FIG. 3(a) shows a bottom view, FIG. 3(b) shows a side view.

FIGS. 4(a), (b) and (c) are views showing a slide member 21, in which FIG. 4(a) shows a plan view, FIG. 4(b) shows a side view and FIG. 4(c) shows a front view, respectively;

DETAILED DESCRIPTION OF PREFERRED EMBODIMENTS

Figure 1A:
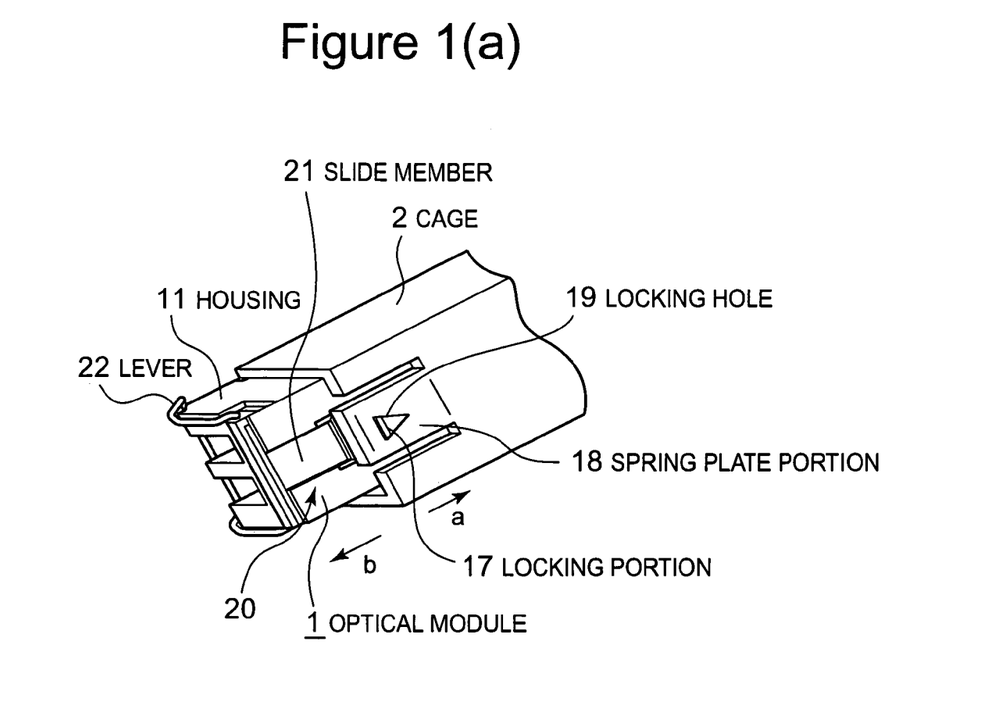
Figure 1B:
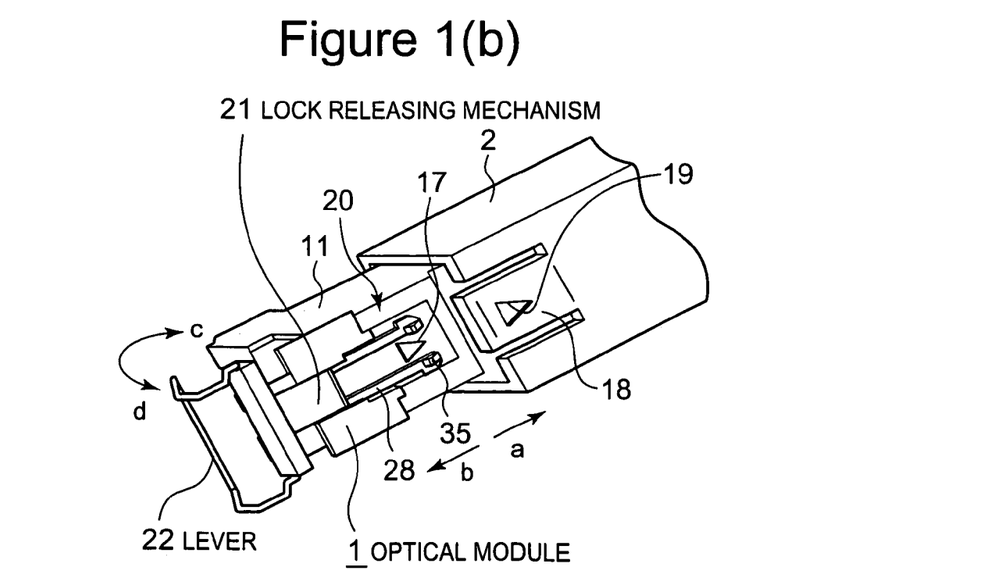

As shown in FIG. 1(a) and FIG. 1(b), an optical module 1 of this embodiment is constructed to be attachable to and detachable from a cage 2 provided on a board (not shown) such as a mother board or the like included in a communication apparatus, for example. When the optical module 1 is attached into the cage 2 in a parallel posture, the optical module 1 is in a locked state where it is locked onto the cage 2, and is connected to an electric connector (not shown) provided at the board side.

The optical module 1 contains various kinds of optical elements which are communication means for performing optical communication, and includes a housing 11 provided with a locking portion 17 which is locked at the cage 2. The optical module 1 also includes a lock releasing mechanism 20 which is a lock releasing means for releasing a locked state of the locking portion 17 of the housing 11 and the cage 2.

An LD (laser diode) as a light emitting element, a PD (photodiode) as a light receiving element, and an optical unit having an optical element such as a lens are provided inside the housing 11, though not shown. The housing 11 is provided with a connecting terminal 13 which is connected to the electric connector at the board side as shown in FIG. 2(C), and an opening 14 for exposing the connecting terminal 13 is formed on a bottom surface at a rear end side, which is inserted into the cage 2 along the inside of the cage 2.

Figures 2A, 2B, 2C:
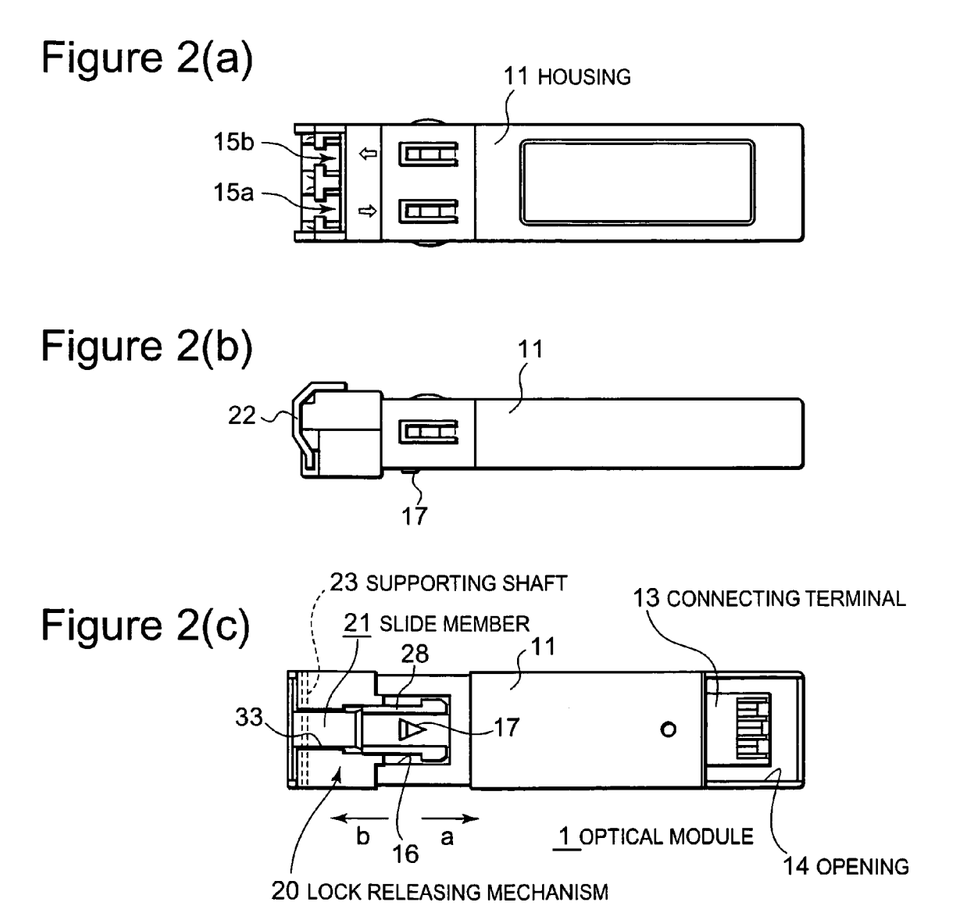

In the housing 11, an input side connecting port 15a and an output side connecting port 15b to which connectors (not shown) of an optical fiber cable are attachably and detachably connected are respectively formed to extend across a front end surface and a top surface, as shown in FIG. 2(a). A connector of the input side optical fiber cable for inputting an optical signal into the optical module 1 from an outside is connected to the input side connecting port 15a, and a connector of an output side optical fiber cable for outputting an optical signal to the outside from the optical module 1 is connected to the output side connecting port 15b.

Figure 3A:
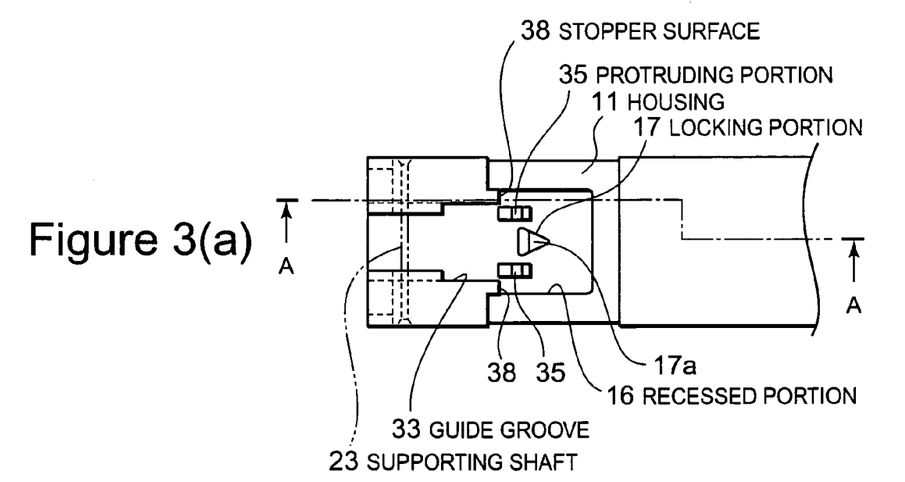
Figure 3B:
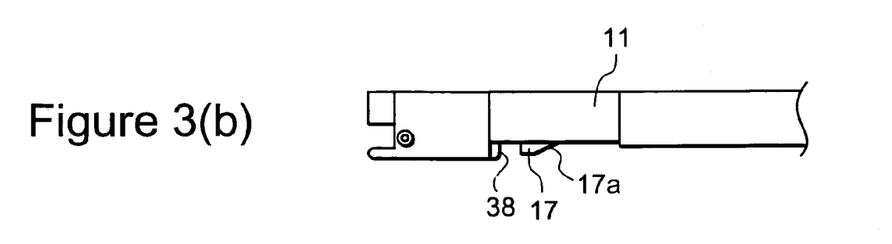
Figure 3C:
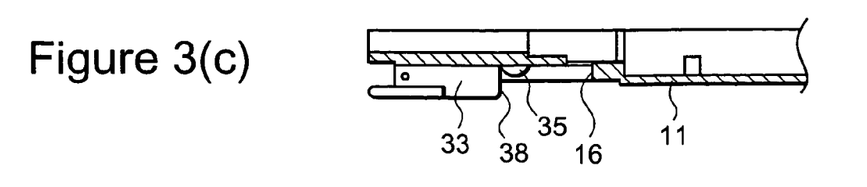
FIG. 3(c) shows a sectional view taken along the A-A line in FIG. 3(a)

As shown in FIG. 3(a) and FIG. 3(c), a recessed portion 16 is provided on a bottom surface of the housing 11, and on the bottom surface in this recessed portion 16, a protruding triangular prism-shaped locking portion 17 is provided for locking onto the cage 2. In this locking portion 17, an inclined surface 17a of which protruded amount from the bottom surface in the recessed portion 16 gradually becomes large as the housing 11 is inserted into the cage 2 is formed at an entry end side which enters the cage 2, as shown in FIG. 3(b).

Meanwhile, a spring plate portion 18 on which the locking portion 17 of the housing 11 is locked is formed at the cage 2 to be elastically displaceable, as shown in FIG. 1(a) and FIG. 1(b). This spring plate portion 18 is provided with a triangular locking hole 19 into which the locking portion 17 is inserted. Accordingly, as the housing 11 is inserted into the cage 2, the spring plate portion 18 is smoothly elastically displaced by the inclined surface 17a of the locking portion 17, and when the housing 11 is attached to the cage 2, the locking portion 17 is locked in the locking hole 19.

The lock releasing mechanism 20 has a slide member 21 for releasing the locked state of the locking portion 17 at the side of the housing 11 and the spring plate portion 18 at the side of the cage 2, a lever 22 for operating this slide member 21 to move in the direction of the arrow a and the direction of the arrow b in FIG. 1, and a supporting shaft 23 for supporting the slide member to be movable in the directions of the arrows a and b.

The slide member 21 is formed by, for example, a resin material such as PPS (polyphenylene sulfide), a metal material having elasticity or the like. The slide member 21 has a base end portion 26 to which the lever 22 is mounted, a slide portion 27 movably supported at the housing 11, and a pair of operation pieces 28 for elastically displacing the spring plate portion 18.

The base end portion 26 is perpendicular to the moving directions of the slide member 21, which are the directions of the arrows a and b in FIG. 1, and is provided with a supporting hole 31 for rotatably supporting the lever 22 across a width direction (hereinafter, simply called a width direction) which is parallel with the bottom surface of the housing 11.

Figure 4:
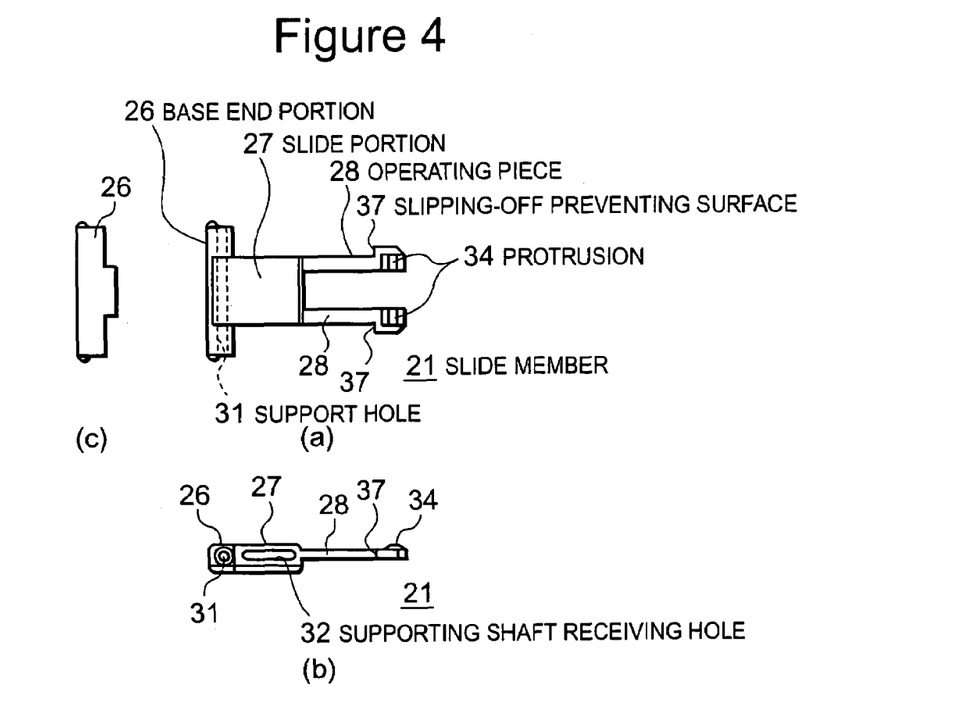

The slide portion 27 is integrally provided at the base end portion 26 as shown in FIG. 4(*b*), and is provided with a supporting shaft receiving hole 32 in a long hole shape into which the supporting shaft 23 is inserted movably in the directions of the arrows a and b as shown in FIG. 2(*c*). The supporting shaft 23 is inserted into the supporting shaft receiving hole 32, and both ends of the support shaft 23 are respectively supported at the shaft holes provided at the housing 11.

As shown in FIG. 2(*c*) and FIG. 3(*a*), a guide groove 33 for guiding the slide portion 27 in the moving direction is provided at the bottom surface of the housing 11, and the slide portion 27 is slid along both opposing side surfaces of the guide groove 33, whereby the relative position of each of the operating pieces with respect to the housing 11 is positioned. The depth of the guide groove 33 is made approximately equal to the thickness of the slide portion 27, so that the slide portion 27 is not protruded from the bottom surface of the housing 11.

As shown in FIG. 4(*a*), a base end of each of the operating pieces 28 is integrally formed at the slide portion 27 with a predetermined space into which the locking portion 17 is capable of entering being provided between the opposing operating pieces 28, and each of the operating pieces 28 is constructed to be elastically displaceable in the thickness direction of the spring plate portion 18. At a tip end of each of these operating pieces 28, a protrusion 34 formed into an approximately trapezoidal shape for elastically displacing the spring plate portion 18 is provided on an opposing surface opposed to the bottom surface of the recessed portion 16 of the housing 11.

Meanwhile, the housing 11 is provided with approximately trapezoidal protruding portions 35, with which the protrusions of the respective operating pieces 28 of the slide member 21 are engaged, at the positions opposing to each other with the locking portion 17 therebetween on the bottom surface of the recessed portion 16 as shown in FIG. 3(*a*) and FIG. 3(*c*).

Each of the operating pieces 28 may be provided with a protrusion, which is made to abut to the spring plate portion 18, on the opposing surface opposed to the spring plate portion 18 when it is necessary to perform fine tuning of the displacement amount when the spring plate portion 18 is elastically displaced or the like, for example, and it is possible to perform fine tuning of the displacement amount of the spring plate portion 18 in accordance with the protruding amount of the projection.

As shown in FIG. 4(*a*) and FIG. 4(*b*), a slipping-off preventing surface 37 being a movement restraining portion which is engaged with the housing 11 side when the slide member 21 is moved in the direction of the arrow b is formed on one side surface which is slide on the side surface of the guide groove 33, at the tip end side of each of the operating pieces 28 of the slide member 21. This slipping-off surface 37 is formed to be approximately perpendicular to the side surface of the operating piece 28.

Meanwhile, as shown in FIG. 3(*a*), a stopper surface 38 for restraining the movement of the slide member 21 is notched and formed at the positions adjacent to the guide groove 33, at the housing 11. This stopper surface 38 is formed to make an acute angle with respect to the side surface of the guide groove 33. Accordingly, when the slide member 21 is operated to move in the direction of the arrow b with respect to the housing 11, the slipping-off preventing surface 37 of each of the operating pieces 28 is favorably butted to the stopper surface 38, whereby the movement of the slide member 21 is restrained and the slide member 21 is prevented from falling off the housing 11.

Then, the slide member 21 movably supported at the housing 11 is constructed so that the operating pieces 28 are not protruded from the inside of the recessed portion 16, and the operating pieces 28 do not slide in contact with the spring plate portion 18, in the state in which the protrusions 34 of the operating pieces 28 are not engaged with the protruding portions 35.

The lever 22 shown in FIG. 1(*b*) and the like is formed into an approximately U-shape of, for example, a metal material such as stainless or a resin material such as PPS, and the shaft portions formed by folding both ends are inserted into the support hole 31 of the base end portion 26 of the slide member 21 shown in FIG. 4(*a*) and the like, and is supported rotatably in the direction of the arrow c and the direction of the arrow d in FIG. 1(*b*).

Figure 5:
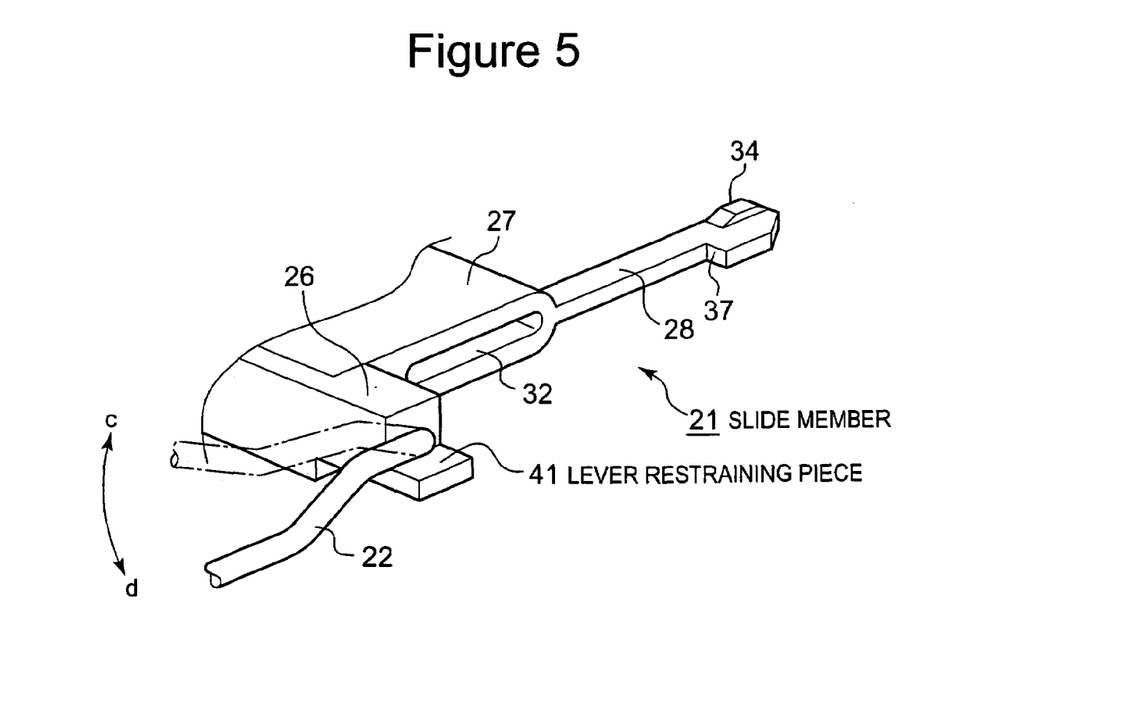
FIG. 5 is a perspective view showing an example of another slide member.

As shown in FIG. 5, the slide member 21 may be provided with lever restraining pieces 41 which are lever retraining portions for restraining the rotating position of the lever 22 at both sides in the width direction of the base end portion 26. By them, the lever 22 abuts to the lever restraining pieces 41 when the lever 22 is rotated in the direction of the arrow d, and is held at a predetermined position by these lever restraining pieces 41, and therefore the lever 22 can be prevented from being rotated more than necessary.

Figure 6:
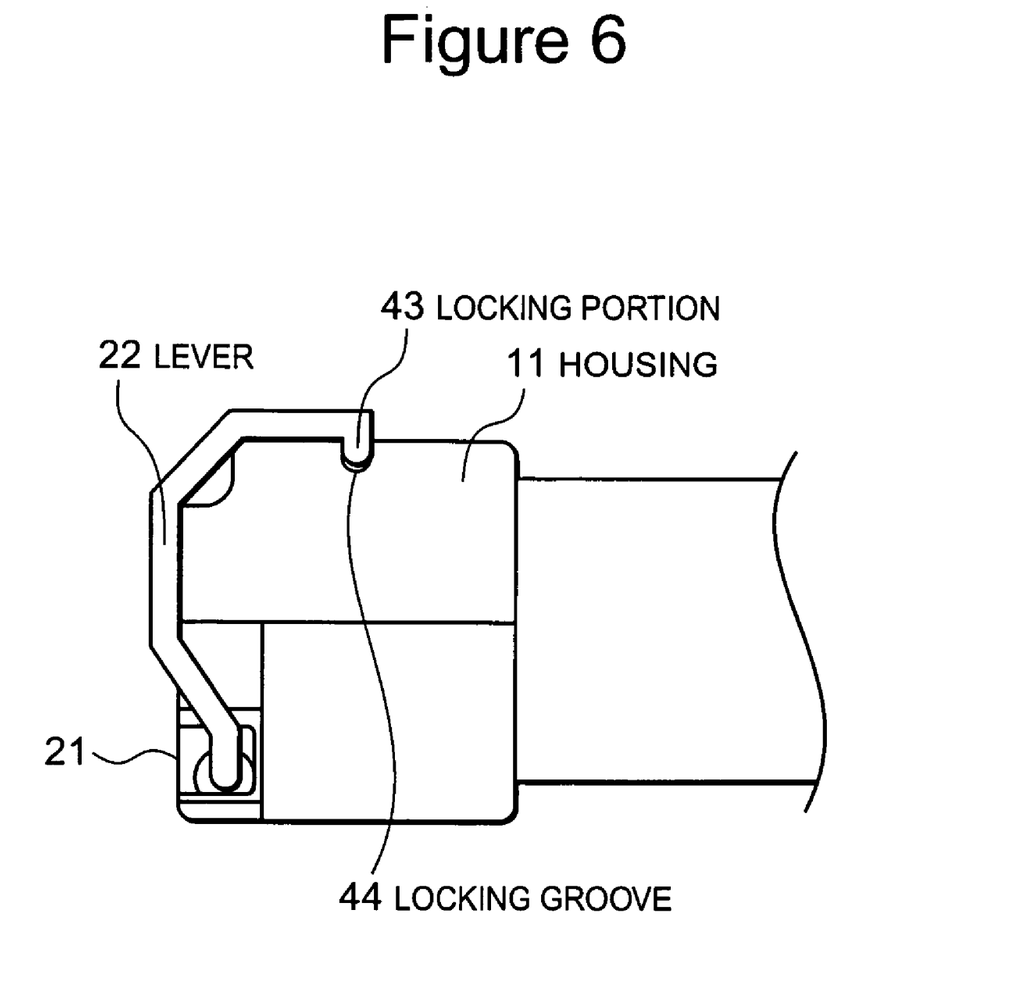
FIG. 6 is a side view showing an example of another lever.

The lever 22 may be constructed to be capable of being housed in the housing 11. As such a construction, a locking portion 43 which is locked on the housing 11 is formed at the lever 22 by folding a part of the lever 22, and a locking groove 44 in which the locking portion 43 of the lever 22 is locked is provided on the top surface of the housing 11, for example, as shown in FIG. 6. This prevents the lever 22 from floating with respect to the housing 11, for example, when the lever is not used.

Though not shown, the lever 22 may be provided with a color-coded indication member in accordance with each specification, for example, for each transmission distance of the optical module 1 as necessary.

Concerning the optical module 1 constructed as above, an operation of releasing the locked state of the housing 11 and the cage 2 by the lock releasing mechanism 20 will be explained with reference to the drawings.

Figure 7:
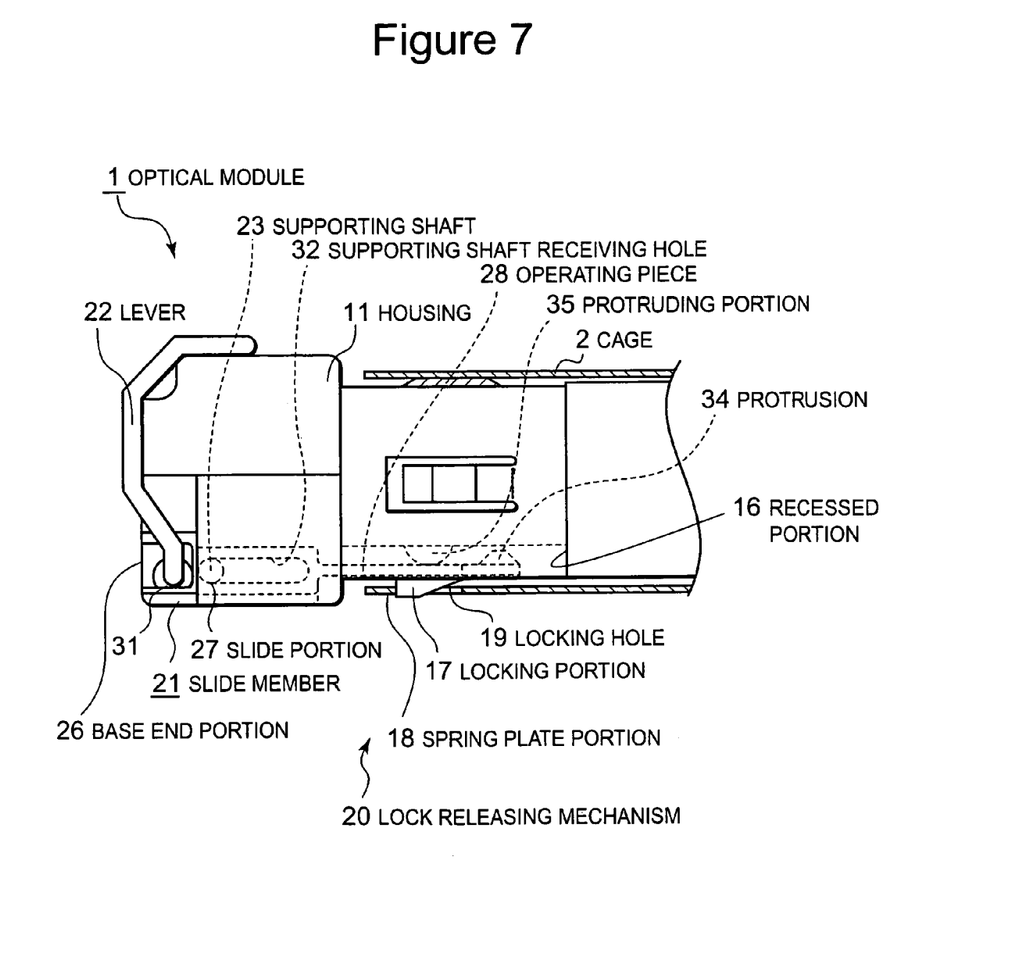
FIG. 7 is a side view showing a state in which the optical module is attached inside a cage.

In the optical module 1, the locking portion 17 and the locking hole 19 are in the locked state and the lever 22 is disposed along the peripheral surface of the housing 11 when the housing 11 is attached in the cage 2, as shown in FIG. 7. At this time, each of the operating pieces 28 of the slide member 21 is moved to the position at which the protrusion 34 is spaced from the protruding portion 35, and is in the posture approximately parallel with the bottom surface of the recessed portion 16, and a gap is ensured between the operating pieces 28 and the spring plate portion 18.

Figure 8:
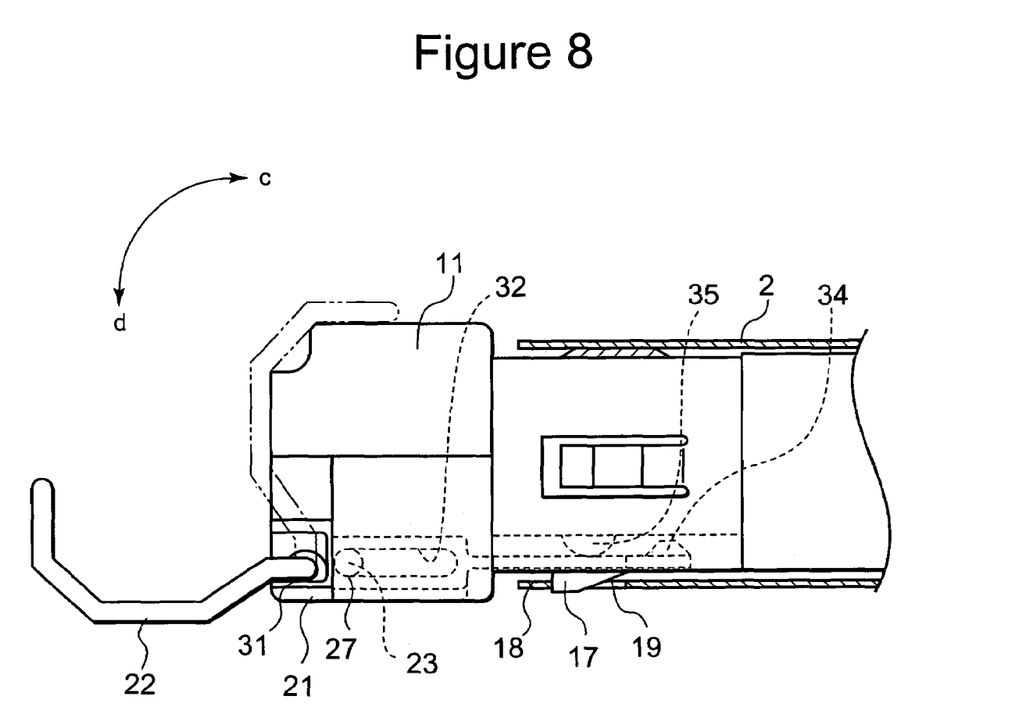
FIG. 8 is a side view showing a state in which the lever is operated to rotate.

First, as shown in FIG. 8, the lever 22 disposed along the peripheral surface of the housing 11 is operated to rotate in the direction of the arrow d, whereby the lock releasing mechanism 20 is brought into the state in which the operation of pulling out the slide member 21 is easily possible.

Figure 9:
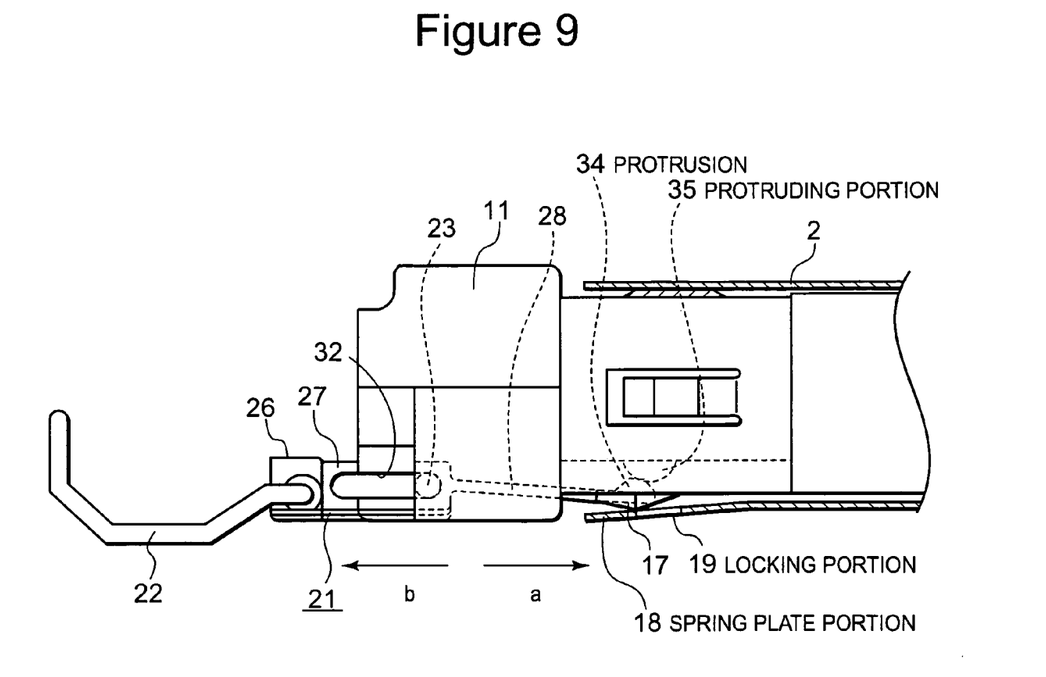
FIG. 9 is a side view showing a state in which the locked state of the housing and the cage is released by the slide member.

Next, as shown in FIG. 9, the operation of gripping the lever 22 and pulling it out in the direction of the arrow b, whereby the slide member 21 is moved in the direction of the arrow b. As the slide member 21 is moved in the direction of the arrow b, the supporting shaft 23 is moved from one end side to the other end side along the inside of the supporting shaft receiving hole 32 of the slide portion 27, and the protrusion 34 of the operating piece 28 is engaged with the protruding portion 35.

With the movement in the direction of the arrow b, the protrusion 34 of the operating piece 28 slides along the protruding portion 35, whereby the slide member 21 is elastically displaced with the base end of the operating piece 28 as the support point, and the operating piece 28 is gradually protruded from the inside of the recessed portion 16. Each of the operating pieces 28 is elastically displaced in the direction to protrude from the inside of the recessed portion 16, and thereby each of the operating pieces 28 elastically displaces the spring plate portion 18 in the direction to release the locked state of the locking portion 17 and the locking hole 19.

In the slide member 21, when the supporting shaft 23 is moved to the other end side of the supporting shaft receiving hole 32, the protrusion 34 of the operating piece 28 is stopped in the vicinity of the peak at which the protrusion 34 has ridden over the peak of the protruding portion 35, and thereby the locked state of the protrusion 34 and the protruding portion 35 is held. Therefore, the spring plate portion 18 is kept in the posture in which the locked state of the locking hole 19 and the locking portion 17 is released by the operating pieces 28, and it becomes possible to pull the housing 11 out of the cage 2.

In the engaged state in which the protrusion 34 of the operating piece 28 is engaged with the vicinity of the top of the protruding portion 35, the position of the operating piece 28, which is protruded from the inside of the recesses portion 16, from the bottom surface of the recessed portion 16 is made approximately equal to the protruded amount of the locking portion 17 from the bottom surface of the recessed portion 16, so that the locked state of the locking portion 17 and the locking hole 19 is released by elastically and smoothly deforming the spring plate portion 18 by minimum necessary amount.

Figure 10:
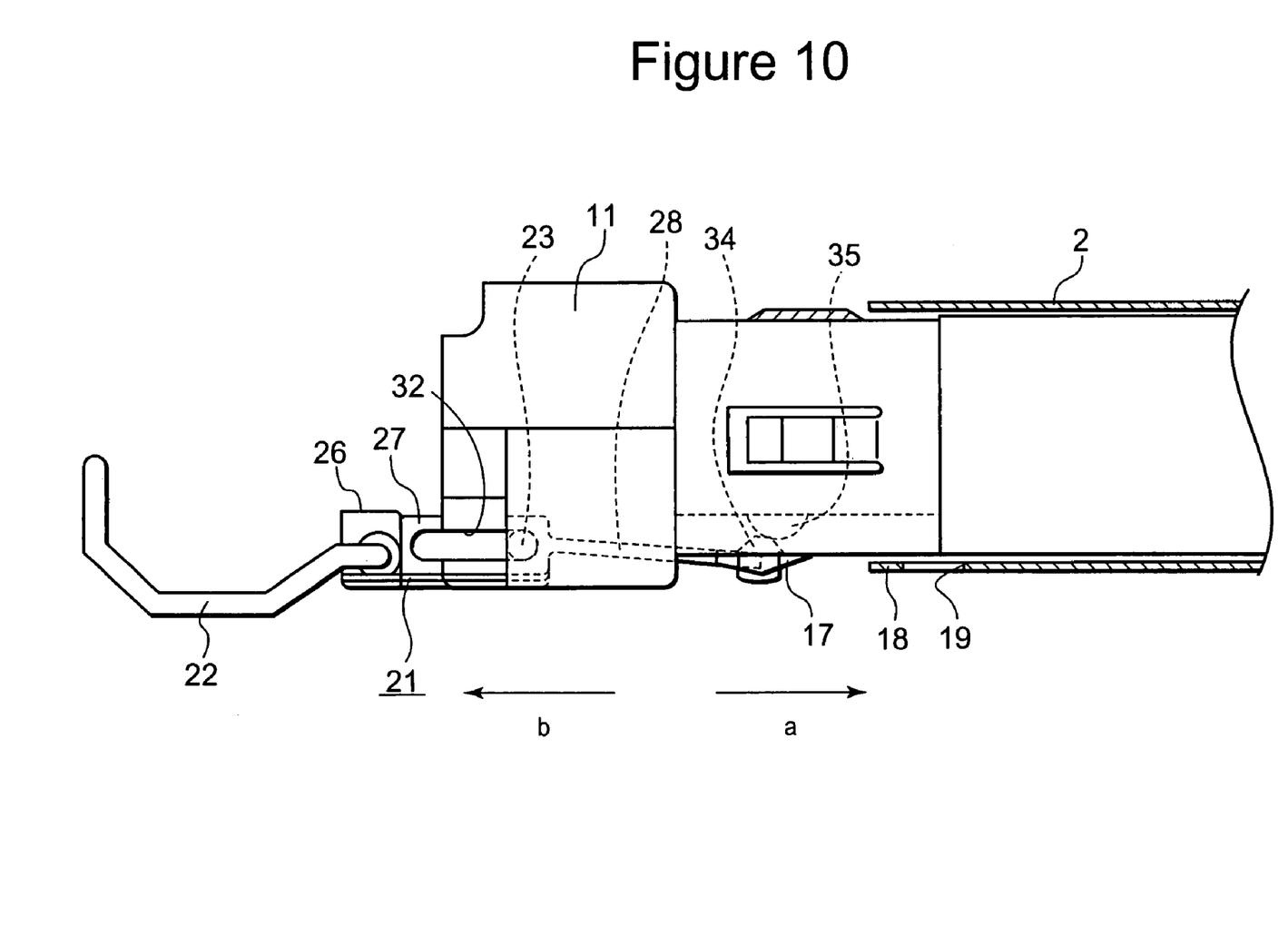
FIG. 10 is a side view showing a state in which the optical module is pulled out of the cage.

Subsequently, as shown in FIG. 10, the slide member 21 is operated to move further in the direction of the arrow b via the lever 22, and thereby the housing 11 is pulled out of the cage 2. When the housing 11 is pulled out of the cage 2, and the locking portion 17 is separated from the locking hole 19, the spring plate portion 18 returns to the flat state by the elastic force. When the slide member 21 is moved in the direction of the arrow b, the supporting shaft 23 abuts to one end of the supporting shaft receiving hole 32, and the slipping-off preventing surface 37 of the operating piece 28 is butted to the stopper surface 38 of the housing 11, whereby the slide member 21 is reliably prevented from falling from the housing 11.

According to the lock releasing mechanism 20, in the slide member 21, the slide portion 27 is slid and guided along both the opposed side surfaces of the guide groove 33 of the housing 11, and thereby the relative position in the width direction of the protrusion 34 with respect to the protruding portion 35 is positioned. The moving range in the directions of the arrows a and b of the slide member 21 is reliably restrained by the supporting shaft 23 moving along the supporting shaft receiving hole 32 of the slide portion 27, and the relative positions in the moving direction of the protrusion 34 of the operating piece 28 and the protruding portion 35 are reliably positioned.

Accordingly, with the movement in the directions of the arrows a and b of the slide member 21, the locked state and the lock releasing state of the protrusion 34 of the operating piece 28 and the protruding portion 35 are smoothly switched, and reliability of the operation of releasing the locked state of the locking portion 17 and the locking hole 19 by the operating piece 28 is sufficiently ensured.

As described above, in the optical module 1, by the operation of pulling out the slide member 21 from the housing 11 with the lever 22, the locked state of the housing 11 and the cage 2 is easily and securely released, and the housing 11 can be easily removed from the inside of the cage 2. Namely, according to the lock releasing mechanism 20, the operation of releasing the locked state of the cage 2 and the housing 11 and the operation of taking the optical module 1 out of the cage 2 are successively performed.

On the other hand, when the optical module 1 is attached inside the cage 2, the spring plate portion 18 at the side of the cage 2 is gradually deformed elastically by the inclined surface 17a of the locking portion 17 at the side of the housing 11, as the housing 11 is inserted into the cage 2 and moved in the direction of the arrow a, and the locking portion 17 is locked in the locking hole 19, whereby the housing 11 is attached inside the cage 2.

As described above, by including the locking releasing mechanism 20 having the slide member 21, the optical module 1 is enhanced in the operability on releasing the locked state of the cage 2 and the housing 11, and the operation of releasing the locked state of the cage 2 and the housing 11 and the operation of taking the optical module 1 out of the cage 2 can be performed with the simple manipulation.

Since in the construction of the lock releasing mechanism 20, the shape of the slide member 21 and the supporting structure for movably supporting the slide member 21 and the like are simplified as compared with the conventional construction, the production cost of the optical module 1 can be reduced and the productivity of the optical module 1 can be enhanced.

While the present invention has been described in connection with various preferred embodiments thereof, it is to be understood that those embodiments are provided merely to illustrate the invention, and should not be used as a pretext to limit the scope of protection conferred by the true scope and spirit of the appended claims.

What is claimed is:

1. A lock releasing mechanism for releasing a lock between a module and a cage, comprising:
   a slide member provided on a predetermined surface of said module;
   a lever mounted on said slide member for rotating to a predetermined position;
   a protruding portion formed on said slide member;
   a shaft provided on said module; and a slot provided on said slide member for receiving said shaft;

wherein said lock releasing mechanism releases said lock when said protruding portion displaces a spring plate portion provided on said cage by moving said slide member in a direction of withdrawing said module from said cage after said lever is rotated, and wherein said shaft abuts against an inner end of said slot so that said slide member is restrained from separating from said module.

2. The mechanism as claimed in claim 1 disengages a locking portion formed on said module from a locking hole formed on said cage when said slide member is moved in said direction of withdrawing.

3. The mechanism as claimed in claim 2, wherein said protruding portion is formed at an opposite end to said lever on said slide member, said protruding portion protrudes said spring plate portion so that said locking portion can be disengaged from said locking hole.

4. The mechanism as claimed in claim 3, wherein said slide member comprises a movement restraining portion for restraining said slide member from separating from a housing of said cage.

5. A module for releasing a lock from a cage and withdrawing from said cage, comprising:
   a housing insertable in said cage;
   a slide member provided on a predetermined surface of said housing;
   a lever mounted on said slide member for rotating to a predetermined position;
   a first protruding portion formed on said slide member;
   a shaft provided on said housing; and
   a slot provided on said slide member for receiving said shaft;
   wherein said lock is released when said protruding portion displaces a spring plate portion provided on said cage by moving said slide member in a direction of withdrawing said module from said cage after said lever is rotated, and
   wherein said shaft abuts against an inner end of said slot so that said slide member is restrained from separating from said module.

6. The module as claimed in claim 5 further comprises a locking portion formed on said housing, and wherein said lock is released by disengaging said locking portion from a locking hole formed on said cage when said slide member is moved in said direction of withdrawing.

7. The module as claimed in claim 6, further comprising:
   a second protruding portion formed on said housing;
   wherein said first protruding portion is formed at an opposite end to said lever on said slide member, said first protruding portion abuts on said second protruding portion and protrudes said spring plate portion so that said locking portion can be disengaged from said locking hole provided on said spring plate portion.

8. The module as claimed in claim 7 further comprises a third protruding portion provided on the opposite side of said slide member against said first protruding portion, and wherein said third protruding portion abuts on a predetermined surface of said cage and protrudes said spring plate portion when said slide member is moved in said direction of withdrawing so that said locking portion can be disengaged from said locking hole.

9. A method for releasing a lock between a module and a cage, wherein said module comprises a slide member provided on a predetermined surface of said module, a lever provided on said slide member, a protruding portion formed on said slide member, a shaft provided on said module and a slot provided on said slide member for receiving said shaft, said method comprising:
   rotating said lever to a predetermined position;
   then pulling out said lever in a direction of withdrawing said module from said cage;
   moving said slide member in said direction of withdrawing by pulling said lever;
   displacing a spring plate portion provided on said cage by moving said slide member;
   then abutting said shaft against an inner end of said slot so that said slide member is restrained from separating from said module; and
   releasing said lock.

10. The method as claimed in claim 9, wherein said releasing step releases said lock by disengaging a locking portion provided on said module from a locking hole provided on said cage when said lever is pulled out.

11. The method as claimed in claim 10, wherein said protruding portion is formed at an opposite end to said lever on said slide member, said protruding portion protrudes said spring plate portion when said lock is released.

12. A lock releasing mechanism for releasing a lock from a cage and being withdrawable from a cage, said lock releasing mechanism comprising:
   a housing insertable into a cage;
   a slide member provided on a first surface of said housing;
   a lever pivotally mounted on said slide member for movement independent of said slide member, said lever being movable from a first retaining position to a second open position;
   a protruding portion formed on said slide member;
   a shaft provided on said housing; and
   a slot provided on said slide member for receiving said shaft;
   wherein said lock releasing mechanism releases said lock when said protruding portion displaces a spring plate portion provided on said cage, said slide member is slid in a direction for withdrawing said module from a cage and said lever is in said second position, and
   wherein said shaft abuts against an inner end of said slot so that said slide member is restrained from separating from said module.

* * * * *